(12) United States Patent
Stravitz et al.

(10) Patent No.: US 11,162,631 B1
(45) Date of Patent: Nov. 2, 2021

(54) TELEVISION STABILIZER

(71) Applicant: Dooli Products, LLC, New York, NY (US)

(72) Inventors: David M. Stravitz, New York, NY (US); Steven G Marton, New York, NY (US)

(73) Assignee: Dooli Products, LLC, New York, NY (US)

( * ) Notice: Subject to any disclaimer, the term of this patent is extended or adjusted under 35 U.S.C. 154(b) by 0 days.

(21) Appl. No.: 17/304,594

(22) Filed: Jun. 23, 2021

(51) Int. Cl.
*F16M 13/02* (2006.01)
*F16M 11/22* (2006.01)

(52) U.S. Cl.
CPC ............ *F16M 11/22* (2013.01); *F16M 13/02* (2013.01); *F16M 2200/08* (2013.01)

(58) Field of Classification Search
USPC ....... 248/351, 499, 500, 506, 447, 454, 455, 248/456, 457, 460, 465, 462
See application file for complete search history.

(56) References Cited

U.S. PATENT DOCUMENTS

| | | | |
|---|---|---|---|
| 6,220,562 B1 * | 4/2001 | Konkle | A47B 97/00 24/298 |
| 6,751,921 B1 * | 6/2004 | Iwakawa | E04B 1/2604 248/174 |
| 6,966,528 B1 * | 11/2005 | Hare | A47B 81/06 248/178.1 |
| 7,530,538 B2 | 5/2009 | Whalen et al. | |
| 7,740,218 B2 * | 6/2010 | Green | F16M 11/28 248/351 |
| 8,087,624 B2 * | 1/2012 | Varney | F16M 11/10 248/125.8 |
| 9,518,695 B2 | 12/2016 | Whalen et al. | |
| 9,709,216 B2 * | 7/2017 | Zing | F16B 9/05 |
| 9,814,312 B2 | 11/2017 | McGowan et al. | |
| 10,113,687 B2 * | 10/2018 | Wise | F16M 13/02 |
| 10,413,061 B2 | 9/2019 | Whalen et al. | |
| 2008/0073475 A1 * | 3/2008 | Gartrell | B42F 13/40 248/460 |

* cited by examiner

*Primary Examiner* — Alfred J Wujciak
(74) *Attorney, Agent, or Firm* — Brian Roffe

(57) ABSTRACT

Stabilizer for a television includes an elongate, rigid portion, a top flap flexibly connected at an upper end of the rigid portion for example by an integral hinge, and a bottom flap flexibly connected at a lower end of the rigid portion for example by an integral hinge. The top flap is attached to a TV by attachment structure and the bottom flap is attached by attachment structure to a support surface to thereby provide a rigid link between the support surface and the TV which prevents the TV from tipping over.

19 Claims, 5 Drawing Sheets

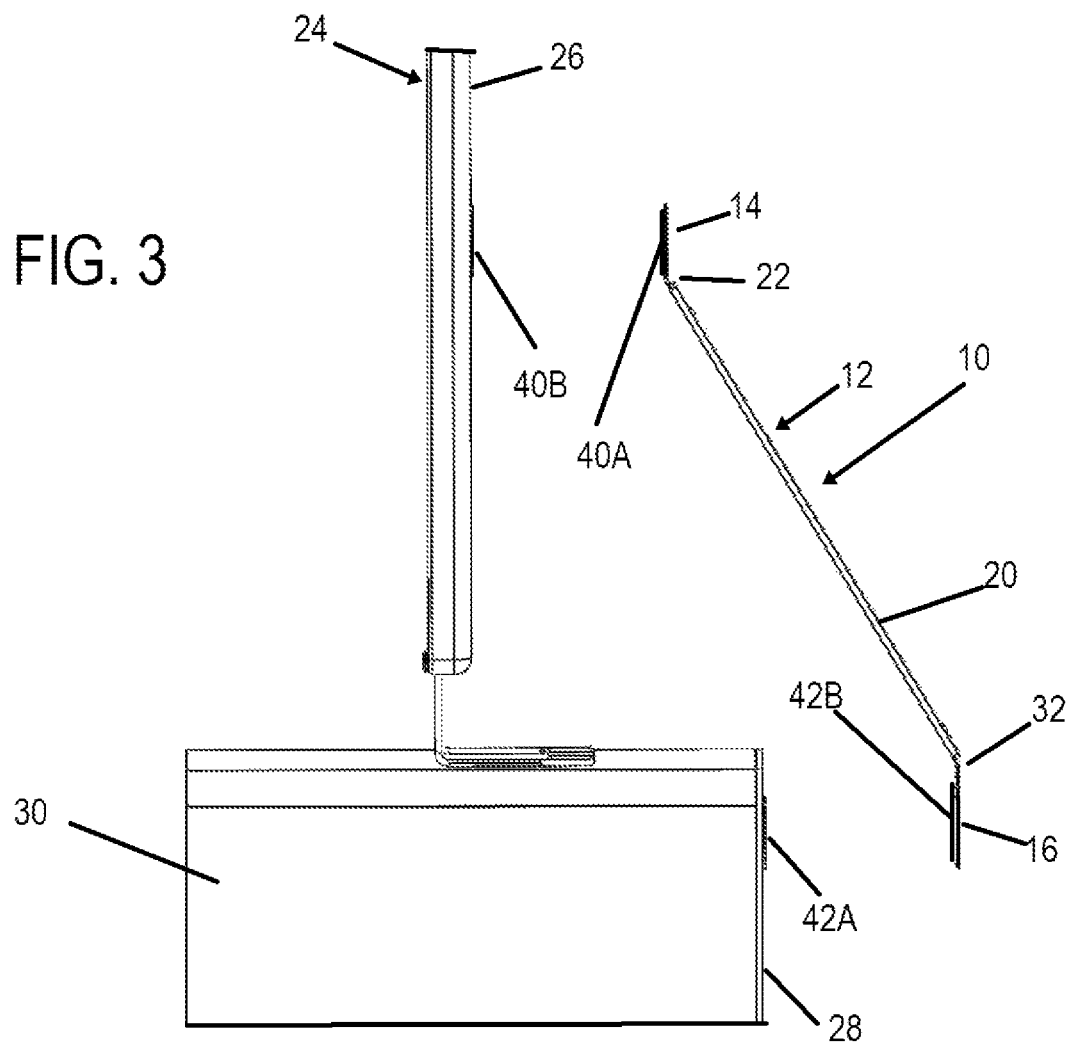

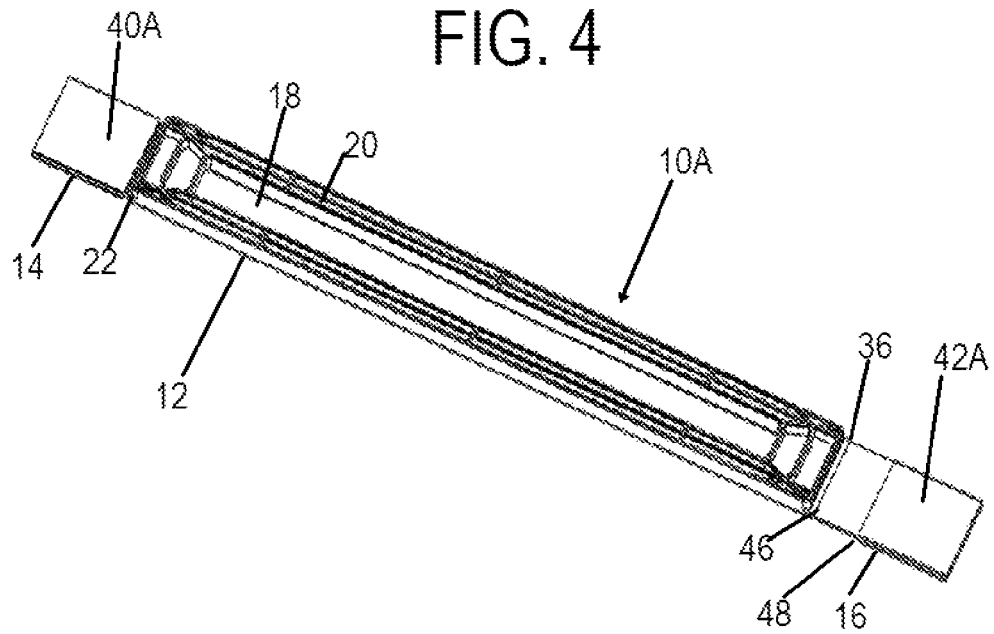
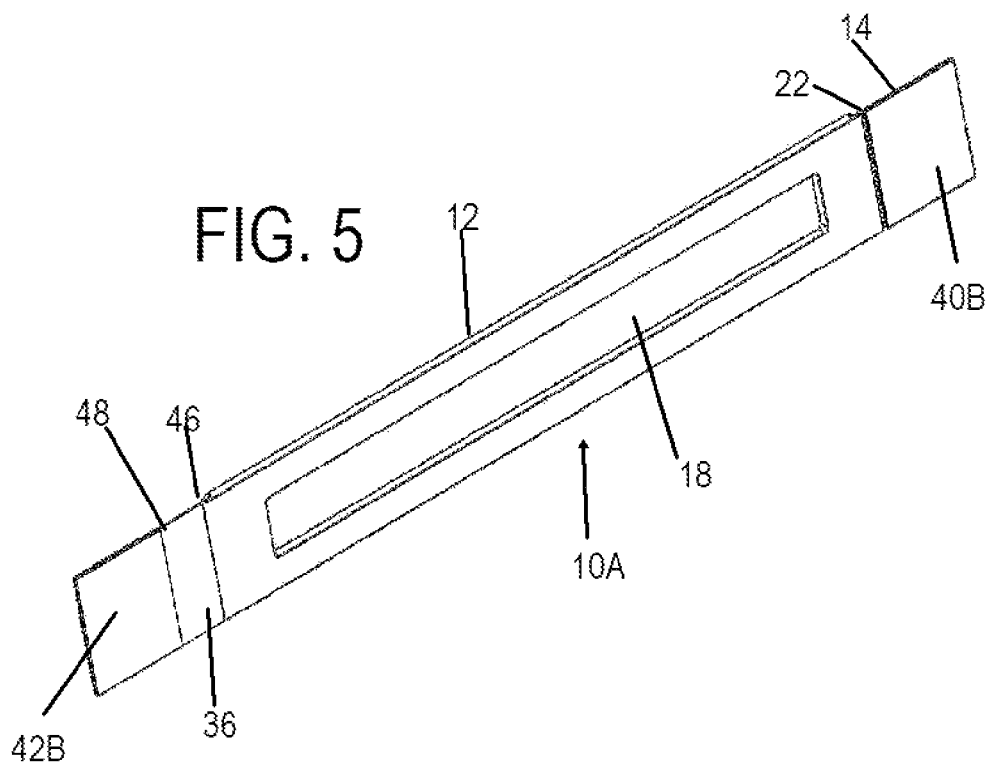

TELEVISION STABILIZER

FIELD OF THE INVENTION

The present invention relates to a stabilizer for a television that secures the television to a fixed structure, such as a piece of furniture or a wall. The present invention also relates to a stabilizer for a television that prevents the television from tipping over, for example, onto a child pulling the television forward, and thereby preventing injury to the child and possible death.

BACKGROUND OF THE INVENTION

The advent of affordable televisions, or TV, and image display technology such as plasma screen and liquid crystals. resulted in the introduction of home TV sets that are large. These TV sets resemble framed pictures than they do the conventional television sets of previous decades. Further, the excellent clarity and precision of cable and satellite signal communication and processing, in association with these new viewing technologies, has led to larger and lighter viewing screens.

Typically today the commercially available plasma screens and liquid crystal displays, because of their thin constructions, are marketed for and installed on walls in a home family room or entertainment area. These installations are complicated and involve not only mounting the screen on the wall, but also the routing of video and speaker cabling within the walls or behind large pieces of furniture. Once installed, the screen is by practical and economic necessity a more or less permanent fixture. Further, such installation of the screen aesthetically challenges the arrangement of other furnishings within the chosen room.

Attempts to develop furniture-top stands have been met with only marginal success since these taller, longer screens, while thinner, can still easily monopolize the entire top or shelf of a large piece of furniture to the exclusion of other items or accessories.

Moreover, it is a problem when children are present that the TV can easily tip over if not adequately secured to the wall or furniture. Injury and possible death of the child can result from a large TV tipping over.

Conventional TV anti-tipping products on the market are often webbing straps that screw on one end to the threaded screw holes in the back of the TV and then are screwed into the backs of the TV stands. Often, there are two straps that tighten up to each other to take up the slack so the TV is secured.

U.S. Pat. No. 7,530,538 (Whalen et al.) describes a for supporting a substantially flat television screen over a piece of furniture of the type having an upper surface with spaced apart front and rear edges, and a back. The device comprises a pedestal and an upper support. The pedestal includes a base for supporting the weight of the screen on a floor surface, a column extending vertically upwardly from the base, and a bracket for connecting the column to the back of the piece of furniture so that the column is held in position against the piece of furniture. The upper support includes a post that is connected to and vertically adjustable with respect to the column, a cantilever support arm extending forwardly from the vertically adjustable post, the support arm terminating in a free end, and a screen mounting member connected to the free end of the support arm for receiving the flat screen television. When the device is mounted adjacent the back of the piece of furniture, with the post vertically adjusted to a desired height, and with a flat television screen attached to the screen mounting member, the flat screen may be supported above the upper surface and at a prescribed point between the front and rear edges of the piece of furniture.

OBJECTS AND SUMMARY OF THE INVENTION

It is an object of at least one embodiment of the invention to provide a stabilizer for a television, or other similar component whether electronic or otherwise, that secures the television to a fixed structure, such as a piece of furniture or a wall.

It is another object of at least one embodiment of the invention to enable a TV to be mounted to a wall or piece of furniture to prevent the TV from tipping over.

A stabilizer for a television in accordance with the invention includes an elongate, rigid portion, a top flap flexibly connected at an upper end of the rigid portion for example by an integral hinge, a bottom flap flexibly connected at a lower end of the rigid portion for example by an integral hinge, first attachment means for attaching the top flap to a TV, and second attachment means for attaching the bottom flap to a support surface.

The integral hinges may be living hinges. The bottom flap may be connected to the rigid portion by multiple living hinges to accommodate variations in the mounting of the bottom flap to the support surface, e.g., if the support surface is a downward-facing support surface of a top shelf of a piece of furniture on which the TV is supported and the bottom flap is to be attached to this bottom-facing surface. The bottom flap may alternatively be connected by a thin wall having a bendable portion at its top adjacent the lower end of the rigid portion and a bendable portion at its bottom adjacent the bottom flap. This thin wall may also be dimensioned to accommodate the thickness of the top shelf of a piece of furniture.

The first attachment means may be hook or loop fasteners, e.g., VELCRO®-type hook or loop fasteners, attached to a planar surface of the top flap by adhesive. In this case, complementary hook or loop fasteners are attachable to the rear surface of the TV to enable attachment of the stabilizer to the TV via cooperation of the hook and loop fasteners.

The second attachment means may be VELCRO®-type hook and loop fasteners attached to a planar surface of the bottom flap by adhesive. In this case, complementary hook or loop fasteners are attachable to the support surface to enable attachment of the stabilizer to the support surface via cooperation of the hook and loop fasteners. An alternative to VELCRO®-type hook and loop fasteners may also be professional adhesive grade foam double-sided tape. An advantage of hook and loop fasteners is that the adherence provided by such fasteners is more easily removable, or relocatable. By contrast, the industrial strength double-sided or double-faced tape offered or example by 3M may be extremely hard to remove and relocate.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 3 is a side view showing the manner in which the TV stabilizer of FIG. 1 is installed to secure a TV to a rear surface of a piece of furniture.

FIG. 4 is a front perspective view of a second embodiment of a TV stabilizer in accordance with the invention.

FIG. 5 is a rear perspective view of the embodiment of a TV stabilizer in accordance with the invention shown in FIG. 4.

DETAILED DESCRIPTION OF THE INVENTION

Figure 1:
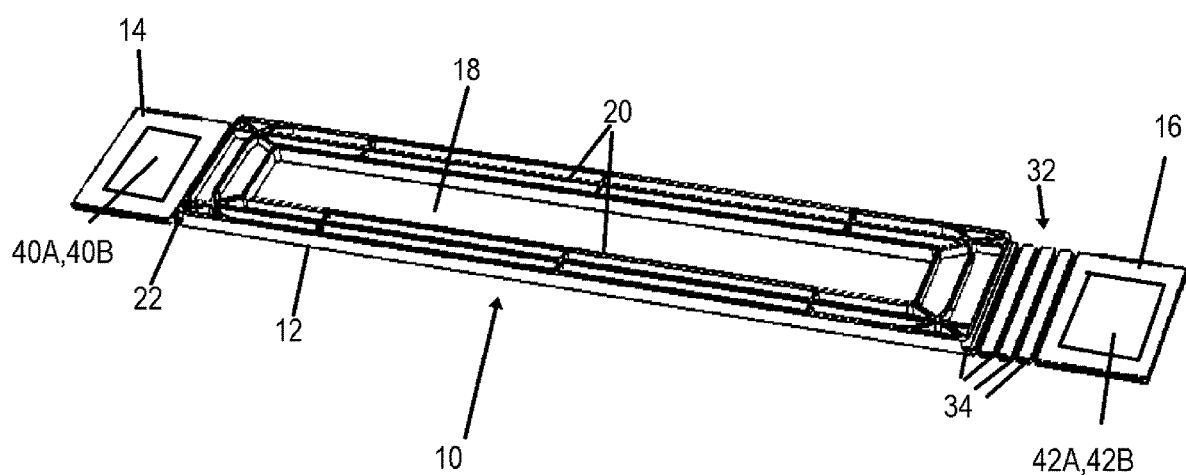
FIG. 1 is a perspective view of one embodiment of a TV stabilizer in accordance with the invention.

As shown in FIG. 1, a TV stabilizer 10 in accordance with the invention includes a central elongate, rigid portion 12, a top flap 14 at an upper end of the rigid portion 12 and a bottom flap 16 at a lower end of the rigid portion 12. Stabilizer 10 can be a flat product sold in the flat condition shown in FIG. 1 to optimize shipping conditions and placement into a shipping box. It can have dimensions of about 4 inches wide and about 23 to about 31 inches long. Moreover, the top and bottom flaps 14, 16 can be folded 180 degrees to provide a further reduction in the length of the stabilizer 10 when packaged.

The rigid portion 12 can have numerous, different forms but it is essential that it be rigid. As shown, the rigid portion 12 has an elongate opening 18 surrounded by ridges or raised ribs 20. Ribs 20 may be considered reinforcement structure that reinforces the longitudinal rigidity of the rigid portion 12. Other forms of reinforcement structure may be used in the invention. The raised ribs 20 add a level of rigidity and, if necessary, can be reinforced with added ribbing, or if necessary a steel rod or plate can be overmolded for added sturdiness and stability.

The top flap 14 is hingedly or flexibly connected to the upper end of the rigid portion 12 by an integral hinge 22 (see FIG. 1). The integral hinge 22 can have different forms, including what is commonly considered a living hinge, i.e. a hinge formed from the same material as the rigid portion 12 and the top flap 14. The integral hinge 22 is linear and extends in a direction between opposed lateral edges of the stabilizer 10.

Figure 2:
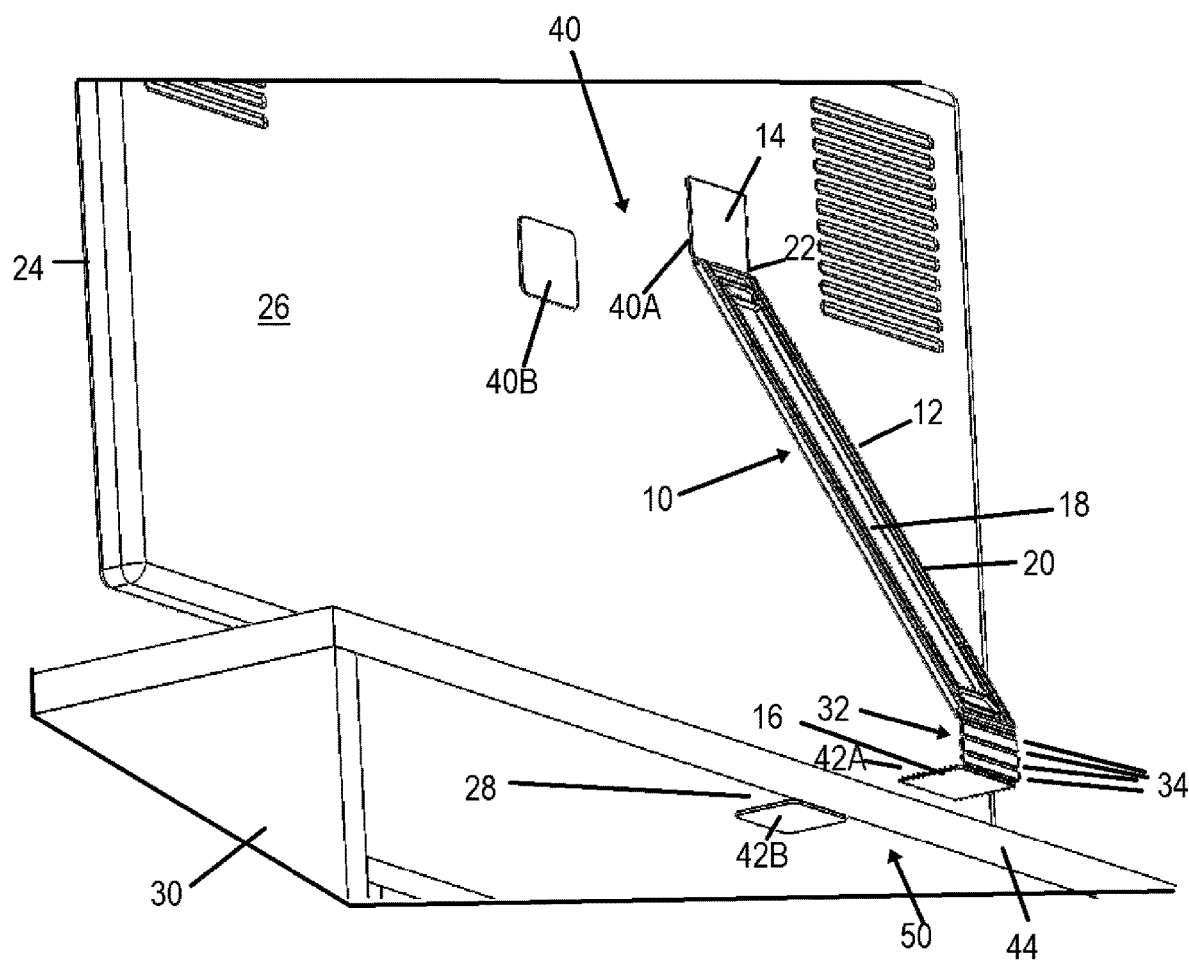
FIG. 2 is a view showing the manner in which the TV stabilizer of FIG. 1 is installed to secure a TV to a piece of furniture.

The integral hinge 22 is configured to enable the top flap 14 to be attached to the TV 24, invariably a rear surface 26 thereof, and is adjustable to conform to the variable angle of the rear surface 26 of the TV 24 relative to the rigid portion 12 (see FIGS. 2 and 3). This means that the angle between the top flap 14 and the rigid portion 14 is variable when the stabilizer 10 is installed. The angle can be any reasonable angle, and since the back or rear surface 26 of the TV 24 is usually vertical or close to vertical, and the location 28 on the wall or other piece of furniture 30 to which the bottom flap 16 is to be attached is also vertical or almost vertical, the angle depends in large part on the distance between the back or rear surface 26 of the TV 24 and the location 28 on the wall or other piece of furniture 30 to which the bottom flap 16 is to be attached.

The bottom flap 16 is hingedly or flexibly connected to the lower end of the rigid portion 12 by a plurality of integral hinges 32 (best seen in FIGS. 1 and 2), or a single flexible member as shown in FIGS. 3-5 described below. Each integral hinge 32 can have different forms, including what is commonly considered a living hinge, i.e. a hinge formed form the same material as the rigid portion 12 and the bottom flap 14. Although a plurality of integral hinges 34 are shown, there may be only a single integral hinge. Each integral hinge 32, e.g., the living hinges 34, extends linearly and in a direction between opposed lateral edges of the stabilizer 10.

As shown, there are four living hinges so the bottom flap 16 is able to wrap around, for example, the back of the top shelf 44 (see FIG. 2) that could be as much as ¾ inches in thickness to that about 1.5 inches in thickness. The four living hinges are equally spaced a total of about 4 inches from the uppermost to the lowermost hinge, i.e., a spacing of about one inch between each pair of adjacent hinges. The flat portion of the bottom flap 16 below the lowermost hinge may be about 4" wide×3" high and is designed to accept VELCRO® or double-sided tape as mentioned below.

The integral hinges 32 are configured to enable the bottom flap 16 to be attached to the location 28 on the wall or other piece of furniture 30 and are adjustable to conform to the variable angle of the rear surface of the location 28 on the wall or other piece of furniture 30 relative to the rigid portion 12. This means that the angle between the bottom flap 16 and the rigid portion 12 is variable when the stabilizer 10 is installed. The angle can be any reasonable angle, and since the back or rear surface 26 of the TV 24 is usually vertical or close to vertical, and the location 28 on the wall or other piece of furniture 30 to which the bottom flap 16 is to be attached may also vertical or almost vertical (see, e.g., FIG. 3), the angle depends in large part on the distance between the back or rear surface 26 of the TV 24 and the location 28 on the wall or other piece of furniture 30 to which the bottom flap 16 is to be attached.

In view of the ability to angle the top flap 14 and bottom flap 16 relative to the rigid portion 12 as desired, the stabilizer 10 can take many different shapes when installed. Indeed, it is possible to position the TV 24 on the piece of furniture 30, connect the top flap 14 to the rear surface 26 of the TV 24 and connect the bottom flap 16 to the back of the piece of furniture (see FIG. 3), and the rigid portion will have set angles relative to the TV 24 and piece of furniture 30. It is then possible to move the TV 24 forward or backward along the upper surface of the piece of furniture 30 and the rigid portion 12 will change its angular orientation relative to the TV 24 and back of the piece of furniture 30. This is all made possible by the presence of the integral hinges 22, 32.

Figure 6:
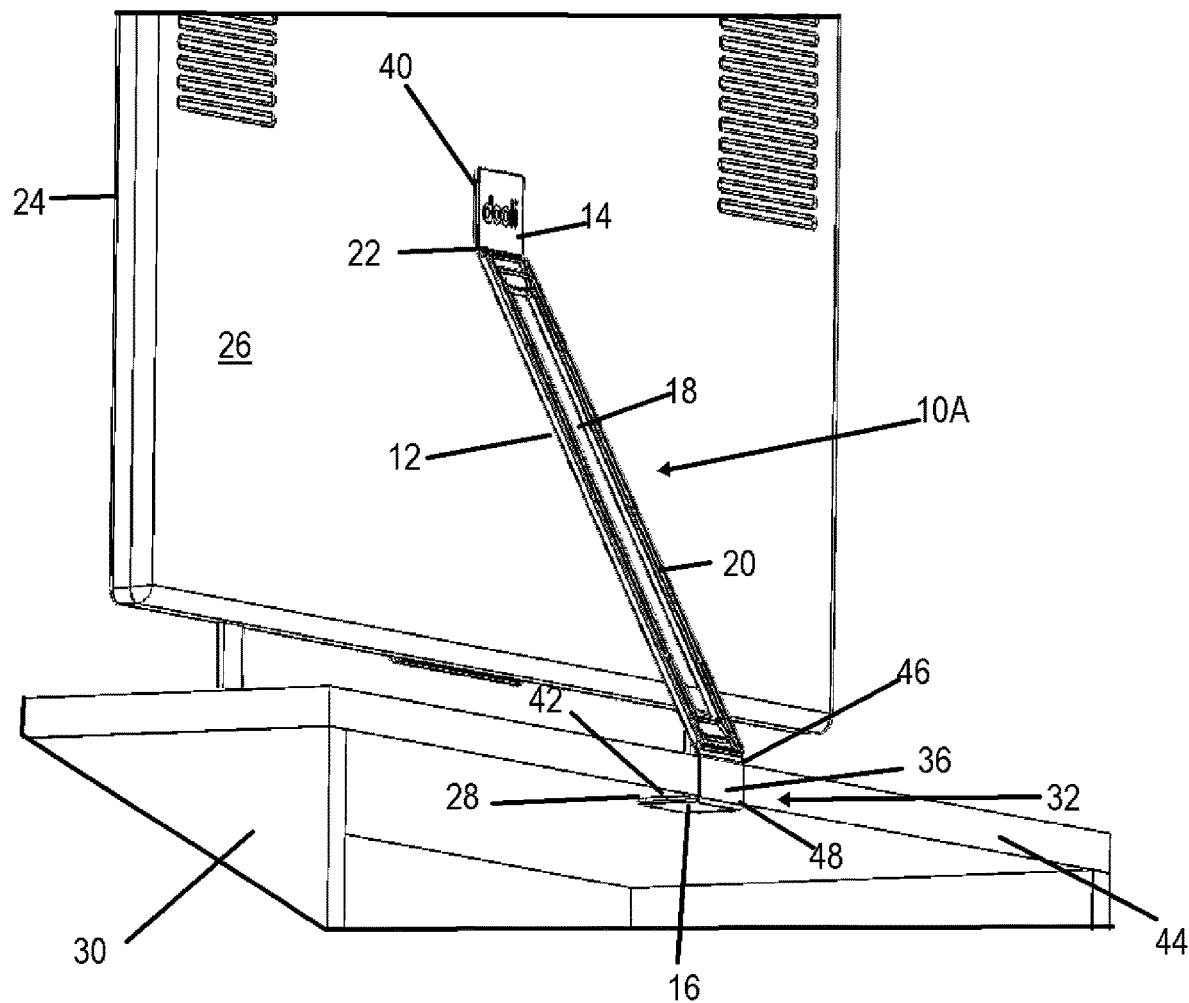
FIG. 6 is a view showing another embodiment of a TV stabilizer of FIGS. 4 and 5 shown installed to secure a TV to a piece of furniture.

FIGS. 4 and 5 show another embodiment of a TV stabilizer, designated 10A. Stabilizer 10A has the same features as stabilizer 10, and only differences will be identified. FIG. 6 shows an exemplifying use of the TV stabilizer 10A.

As shown in FIGS. 4-6, instead of a plurality of living hinges 34 as the interface between the lower end of the rigid portion 12 and the bottom flap 16 as in the embodiment shown in FIGS. 1-3, the interface of the stabilizer 10A may include a thin wall 36 having a hinge or bendable portion 46 at its top and another hinge or bendable portion 48 at its bottom, each of which might be an integral hinge, one or more living hinges or simply a thinned portion of material that enables bending of the wall 36 relative to the rigid portion 12 and the bottom flap 16. The bendable portions 46, 48 enables variability in the angular orientation of the rigid portion 12 relative to the top and bottom flaps 14, 16 and thus relative to the rear surface 26 of the TV 24 and surface of the wall or piece of furniture 30 to which the top and bottom flaps 14,16 are attached, respectively. The thin wall 36 preferably is dimensioned to have a height corresponding to the thickness of the top shelf 44 of conventional furniture (see FIG. 6). Exact correspondence to the thickness of a top shelf 44 is not always possible due to different manufacturers having different furniture with top shelves of different thickness, but an approximate dimensioning of the height of the thin wall 36 to the top shelf will improve the securing of the TV stabilizer 10A and its functionality.

All features and uses for stabilizer 10 are equally applicable to stabilizer 10A, and vice versa, aside from the differences in the design relating to the manner in which the bottom flap 16 is attached to the rigid portion 12.

Stabilizers 10, 10A may be made of any suitable plastic material and may have uni-body construction. It is believed that the only real effective material for one piece living hinges is polypropylene. This means that they can be formed from one type of material and manufactured by a suitable material formation technique to have the shape and form as disclosed and/or illustrated in this application. For example, the stabilizers 10, 10A may be made of polypropylene, although NYLON® plastic might also be suitable, but this identification of materials does not limit the invention. Alternatively, mechanical hinges may be used and hinge means will therefore be considered any type of hinge that enables relative rotation or pivoting between the parts connected to and on opposite sides of the hinge.

Advantages of the stabilizers 10, 10A are numerous. First, whereas, most or all current webbing straps for TVs are screwed into a defined threaded screw location on the rear surface 26 of the TV 24, stabilizers 10, 10A provides unlimited locations, both singularly or as a plurality, depending on the size of the TV 24. The further back the TV 24 is placed on the TV stand as an example of a piece of furniture 30, the higher will be engagement of the stabilizer placement onto the TV 24. Conversely, the further away from the rear surface of the TV stand and closer to the leading edge of the TV stand, the lower will be the engagement of the stabilizer placement onto the TV 24.

In most if not all instances, placement of the bottom flap 16 will be on the wall in back of the TV stand, or the bottom surface of a top shelf of the TV stand (if and when present), or the back wall behind the TV stand in which case the stabilizer 10 is installed independent of the TV stand. A pivot point defined between the uppermost hinge between the bottom flap 16 and the rigid portion 12 can remain consistent, irrespective of the placement of the TV 24 on the upper surface of the piece of furniture 30. The angle directed to the TV 24 of the reinforced, substantially rigid portion 12 is adjusted accordingly.

At its core, the invention is a rigid structure that is securely fastened to the TV 24 on one side, and fastened likewise to one of at least three different surfaces or configurations, namely, a back wall of the piece of furniture 30 on which the TV 24 is placed, a back bottom surface of a piece of furniture 30 on which the TV 24 is placed, and a wall behind the piece of furniture 30 on which the TV 24 is placed. Each of these is considered the location 28 at which the bottom flap 16 is attached.

As to the manner in which the top and bottom flaps 14, 16 are attached to the TV 24 and location 28 respectively, the first and second attachment means to perform this attachment, 40, 42, respectively, may be any known means to form a strong bond between two surfaces. In a preferred embodiment, the attachment means 40, 42 comprise adhesive-backed VELCRO® (hook and loop fasteners, or similar product) or double-sided or double-faced professional grade foam tape. The attachment means 40, 42 could be a type of permanent attachment in that it is extremely difficult to remove. The force against separation must be strong enough to prevent a toddler from grabbing the TV 24 and pulling it forward and allowing the TV 24 to tip over. Adhesive and VELCRO® is virtually impossible to remove and professional grade hook and loop fasteners are very tough to separate.

First and second attachment means 40, 42 may thus have two components. One attached to the stabilizer 10, 10A and one attached to the TV 24 or piece of furniture 30. FIGS. 1-6 show this as components 40A, 40B and 42A, 42B.

The size of the top flap 14 and bottom flap 16 may vary depending on the desired surface area of the first and second attachment means 40, 42. In one embodiment, the top and bottom flaps 14, 16 each have a substantially planar surface on that side facing the TV 24 or the location 28 on the piece of furniture 30. This planar surface may have a size of about 4 inches square and can receive a 3 inch square or 4 inch square or 3×4 inch piece of adhesive-backed VELCRO®.

Note that the bottom flap 16 can be provided with planar surfaces on both sides because when attached to a rear wall portion of the piece of furniture 30 (see FIG. 3) or to the underside of a top shelf of a piece of furniture (see FIG. 6), the second attachment means 42 would be on the same side of the stabilizer 10, 10A as the first attachment means 40, i.e., the front-facing side. On the other hand, when attached to a rear wall behind the piece of furniture 30, the second attachment means 42 would be on the opposite side of the stabilizer 10, 10A as the first attachment means 40, i.e., the rear-facing side. The second attachment means 42 could be included in a kit with the remaining parts of the stabilizer 10, 10A to enable the installer to install the second attachment means 42 on the front-facing or rear-facing planar surface of the bottom flap 16 depending on the specific installation.

Another advantage of the stabilizer 10, 10A is that they are reusable when replacing the current TV, or repositioning the existing TV. To accomplish that, the side opposite the mounting TV side will require replacement of the attachment means 40, 42 as that engagement should and will be hard to remove, although one may consider removing it with Goo Gone® or other adhesive removing products.

Another advantage of the stabilizers 10, 10A is that they do not require screws to be attached to the TV 24. Currently, most or all TV tip-prevention products require screwing into the threaded holes on the TV as well as that of the back of the TV cabinet or other piece of furniture on which the TV is supported. Most require two webbed components that allow you to tighten the slack. Lack of screws enables the top flap 14 to be connected to almost any location on the rear surface of the TV 24. With screws, you are limited to the placement of the webbing straps. By contrast, with both embodiments of the present invention, placement can be centered, or off centered should the installer choose to use more than one stabilizer.

Indeed, it is now possible to provide multiple stabilizers 10, 10A to connect the TV 24 to the piece of furniture 30. If two stabilizers 10, 10A are provided, they can be appropriately spaced apart from each other and apart from the lateral edges of the TV 24 to provide an improved securing of the TV 24 to the piece of furniture 30. As to suggested placements, for TVs in the 55 inch or less range may require only one stabilizer 10, 10A, while larger TV can ideally use two, evenly spaced apart stabilizers 10, 10A, spaced apart about 25 inches to about 35 inches, for example.

Another advantage over the webbing is the rigidity of the rigid portion 12 and the optional raised ribs which constitute reinforcement means that resist back-flexing of the TV 24. This minimizes and should eliminate a rocking condition as in conventional stabilizers including webbed straps, which condition reduces the recoil one may experience should a toddler push hard onto the TV 24, which when recoiled can cause possible disengagement of the webbed strap. Moreover, there is simply no need for adjustable webbed straps since the stabilizer 10, 10A fits most if not all TVs 24.

Yet another advantage is that installation of the stabilizer 10, 10A can be accomplished in seconds, as opposed to the timely installation of prior art TV stabilizers that require screwing and pulling the slack to make the TV stand secure.

It is preferred that stabilizers 10, 10A be molded as one piece with weakened living hinges. However, it is also possible to make the stabilizers 10, 10A in sections with mechanical hinges. Furthermore, the stabilizers 10, 10A can be a combination of mixed materials where the main stabilizer member is steel, and the hinged parts are hinged by pin plastic components. The central area, if steel, will further resist the forward and backing rocking of larger, flat screen TVs. This forward and backing motion (primarily backing) can cause a recoil that may rebound forward and thus disengage mounting support of conventional TV stabilizers with webbing straps resulting in potential injuries.

The stabilizers 10, 10A can be sold along with TVs. They can be tailored, designed or configured for specific TVs and sold by the manufacturers of such TVs to consumers when purchasing the TVs.

Methods for stabilizing a TV, representative of any type of component that is to be placed onto a piece of furniture, are mentioned above. Generally, in such an exemplifying, non-limiting method, the stabilizer as described above is provided, the top flap is attached to a rear surface of the component using first attachment structure on a planar surface of the top flap, and the bottom flap is attached to the piece of furniture or wall behind the piece of furniture using second attachment structure on a planar surface of the bottom flap (of which there may be two on opposite sides of the bottom flap and which one is used depends on the installation, i.e., whether to the furniture or wall). The order of attachment of the top and bottom flaps is not critical in the invention. The television is positioned appropriately to ensure a secure placement on the furniture.

When stabilizer 10A in particular is used, the bottom flap is attached to the piece of furniture by bending the thin wall 36 over the top shelf 44 of the piece of furniture such that the bottom flap 16 is alongside an underside or lower surface 50 of the top shelf 44 and attaches to the underside or lower surface 50 of the top shelf 44 via the hook and loop fasteners or double-sided or double-faced tape, or other comparable attachment structure or attachment means. This same installation is also applicable for stabilizer 10 in which case, the appropriate living hinge 34 is selected about which to bend the bottom flap 16 relative to the rigid portion 12 to provide for a tight fit of the bottom flap 16 and region of hinges 34 against the top shelf 44.

Also, when stabilizer 10A is used, since the bottom flap 16 is provided with a planar surface on both sides, it is necessary to select which planar surface to apply the second attachment structure, e.g., VELCRO® type hook and loop fasteners, to depending on whether the bottom flap 16 is to be attached to the piece of furniture (in which case, the attachment structure would be applied to the same, front side of the stabilizer 10A as the first attachment structure for the top flap 14 is applied to) or to the wall (in which case, the attachment structure would be applied to the opposite, rear side of the stabilizer 10A as the first attachment structure for the top flap 14 is applied to).

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A stabilizer for a television, comprising:
   an elongate, rigid portion;
   a top flap flexibly connected at an upper end of said rigid portion;
   a bottom flap;
   an integral hinge that flexibly connects said bottom flap to a lower end of said rigid portion, said integral hinge comprising a plurality of living hinges;
   first attachment means arranged at least partly on a planar surface of said top flap for attaching said top flap to the television; and
   second attachment means arranged at least partly on a planar surface of said bottom flap for attaching said bottom flap to a support surface.

2. The stabilizer of claim 1, wherein said rigid portion, said top flap and said bottom flap have a flat state.

3. The stabilizer of claim 1, wherein said rigid portion comprises reinforcement structure to reinforce rigidity of said rigid portion.

4. The stabilizer of claim 1, further comprising an integral hinge that flexibly connects said top flap to said upper end of said rigid portion.

5. The stabilizer of claim 1, wherein said integral hinge further comprises a thin wall having a bendable portion at its top adjacent said lower end of said rigid portion and a bendable portion at its bottom adjacent said bottom flap, one of said plurality of living hinges being between said lower end of said rigid portion and said thin wall and another one of said plurality of living hinges being between said thin wall and said bottom flap.

6. The stabilizer of claim 1, wherein said first attachment means comprise one of hook and loop fasteners attached to the planar surface of said top flap, whereby the other of hook and loop fasteners are attachable to the rear surface of the television to enable attachment of the stabilizer to the television via cooperation of the hook and loop fasteners.

7. The stabilizer of claim 1, wherein said second attachment means comprise one of hook and loop fasteners attached to the planar surface of said bottom flap, whereby the other of hook and loop fasteners are attachable to the support surface to enable attachment of the stabilizer to the support surface via cooperation of the hook and loop fasteners.

8. The stabilizer of claim 1, wherein said rigid portion and said top and bottom flaps have a unibody construction.

9. The stabilizer of claim 1, wherein said bottom flap defines opposite planar surfaces on opposite sides of the stabilizer, said second attachment means being attachable to either of said planar surfaces.

10. The stabilizer of claim 1, wherein said plurality of living hinges comprise four living hinges equally spaced apart from one another or extending linearly between opposed edges of said integral hinge.

11. A stabilizer to stabilize a component on a piece of furniture, comprising:
    an elongate, rigid portion;
    a top flap;
    first attachment structure arranged at least partly on said top flap to attach said top flap to the component;

a flexible hinge connecting an upper end of said rigid portion and said top flap;
a bottom flap;
second attachment structure arranged at least partly on a planar surface of said bottom top flap to attach said bottom flap to the piece of furniture or a wall behind the piece of furniture; and
a plurality of hinges connecting a lower end of said rigid portion and said bottom flap.

12. The stabilizer of claim 11, wherein said rigid portion comprises reinforcement structure to reinforce rigidity of said rigid portion.

13. The stabilizer of claim 11, further comprising a thin wall between said bottom flap and said lower end of said rigid portion, said plurality of hinges comprising a first hinge connecting said thin wall and said bottom flap and a second hinge connecting said thin wall and said lower end of said rigid portion.

14. The stabilizer of claim 11, wherein said first attachment means comprise a first type of hook or loop fasteners attached to the planar surface of said top flap, whereby a second, cooperating type of hook or loop fasteners are attachable to the rear surface of the component to enable attachment of the stabilizer to the component via cooperation of the hook and loop fasteners.

15. The stabilizer of claim 11, wherein said second attachment means comprise a first type of hook or loop fasteners attached to the planar surface of said bottom flap, whereby a second, cooperating type of hook or loop fasteners are attachable to the piece of furniture to enable attachment of the stabilizer to the piece of furniture or wall via cooperation of the hook and loop fasteners.

16. The stabilizer of claim 11, wherein said rigid portion and said top and bottom flaps have a unibody construction.

17. A method for stabilizing a component on a piece of furniture, comprising:
providing a stabilizer having an elongate, rigid portion, a top flap flexibly connected at an upper end of the rigid portion, a bottom flap and an integral hinge that flexibly connects the bottom flap to a lower end of the rigid portion, the integral hinge comprising a plurality of living hinges;
attaching the top flap to a rear surface of the component using first attachment structure on a planar surface of the top flap; and
attaching the bottom flap to the piece of furniture or wall behind the piece of furniture using second attachment structure on a planar surface of the bottom flap while the bottom flap bends relative to the rigid portion via one or more of the plurality of living hinges.

18. The method of claim 17, further comprising providing the stabilizer with a thin wall having a bendable portion at its top adjacent the lower end of the rigid portion and a bendable portion at its bottom adjacent the bottom flap, the step of attaching the bottom flap to the piece of furniture or wall behind the piece of furniture using second attachment structure on a planar surface of the bottom flap comprising attaching the bottom flap to the piece of furniture by bending the thin wall over a top shelf of the piece of furniture such that the bottom flap is alongside an underside or lower surface of the top shelf and attaches to the underside or lower surface of the top shelf.

19. The method of claim 17, wherein the step of attaching the bottom flap to the piece of furniture or wall behind the piece of furniture using second attachment structure on a planar surface of the bottom flap comprises providing the bottom flap with a planar surface on both sides and selecting which planar surface to apply the second attachment structure to depending on whether the bottom flap is to be attached to the piece of furniture or to the wall.

* * * * *